US009864851B2

(12) United States Patent
Adams et al.

(10) Patent No.: US 9,864,851 B2
(45) Date of Patent: Jan. 9, 2018

(54) SYSTEM, DEVICE, AND METHOD FOR AUTHENTICATION OF A USER ACCESSING AN ON-LINE RESOURCE

(75) Inventors: Neil Patrick Adams, Waterloo (CA); Scott Alexander Vanstone, Campbellville (CA); Daniel Richard L. Brown, Mississauga (CA); Dinah Lea Marie Davis, Waterloo (CA); Christopher Labrador, Austin, TX (US); Alfred John Menezes, Waterloo (CA)

(73) Assignees: BlackBerry Limited, Waterloo, Ontario (CA); Certicom Corp., Mississauga, Ontario (CA)

( * ) Notice: Subject to any disclaimer, the term of this patent is extended or adjusted under 35 U.S.C. 154(b) by 0 days.

(21) Appl. No.: 14/235,384

(22) PCT Filed: Jul. 28, 2011

(86) PCT No.: PCT/CA2011/050467
§ 371 (c)(1),
(2), (4) Date: Jan. 27, 2014

(87) PCT Pub. No.: WO2013/013291
PCT Pub. Date: Jan. 31, 2013

(65) Prior Publication Data
US 2014/0173704 A1 Jun. 19, 2014

(51) Int. Cl.
*G06F 17/30* (2006.01)
*G06F 21/31* (2013.01)
(Continued)

(52) U.S. Cl.
CPC .............. *G06F 21/31* (2013.01); *G06F 21/33* (2013.01); *H04L 9/0869* (2013.01); *H04L 9/3226* (2013.01); *H04L 63/06* (2013.01); *H04L 63/083* (2013.01)

(58) Field of Classification Search
CPC ......... G06F 21/31; G06F 21/33; H04L 63/06; H04L 63/083; H04L 9/0869; H04L 9/3226
See application file for complete search history.

(56) References Cited

U.S. PATENT DOCUMENTS 9,003,540 B1 * 4/2015 Johansson ........... H04L 63/0807
713/170
2004/0139001 A1 * 7/2004 Henriques et al. ............. 705/39
(Continued)

FOREIGN PATENT DOCUMENTS

| CA | 2450056 A1 | 5/2004 |
| CA | 2467896 A1 | 11/2004 |
| CN | 101340436 B | 1/2009 |

OTHER PUBLICATIONS

International Preliminary Report on Patentability mailed Jan. 28, 2014; in PCT patent application No. PCT/CA2011/050467.
(Continued)

*Primary Examiner* — Mohammed Waliullah
(74) *Attorney, Agent, or Firm* — Fish & Richarson P.C.

(57) ABSTRACT

A system, device and method for authenticating a user. The system, device and method may employ a computing device for providing credentials required for access to an on-line resource available over a network. The computing device may connect to the on-line resource to register a user. The computing device may receive from the on-line resource at least one request for a credential to identify the user. In response to the request, the computing device may generate a random credential, store the random credential in association with an on-line resource identifier and the request in a data store accessible to the computing device and, submit the random credential to the on-line resource to register the user.

20 Claims, 3 Drawing Sheets

(51) Int. Cl.
*H04L 9/08* (2006.01)
*H04L 9/32* (2006.01)
*G06F 21/33* (2013.01)
*H04L 29/06* (2006.01)

(56) References Cited

U.S. PATENT DOCUMENTS

2010/0077208 A1    3/2010  Appiah et al.
2010/0250925 A1*   9/2010  Hiraide et al. ............... 713/165
2012/0151570 A1*   6/2012  Cooppan ............ H04L 63/0823
                                                            726/10

OTHER PUBLICATIONS

International Search Report mailed Apr. 20, 2012, in corresponding PCT patent application No. PCT/CA2011/050467.
English abstract for CN101340; published on Jan. 7, 2009 and retrieved on Jan. 27, 2014.
Extended European Search report mailed Nov. 21, 2014; in European patent application No. 11870032.7.
Squidoo; "Close 1 Password Review—Mac password Manager Software for Apple Mac OSX", Internet Citation, Jan. 9, 2008, pp. 1-18, XP002538262, retrieved from the internet: URL: http://www.squido.com/1password [retreived on Jul. 21, 2009].
Extended European Search Report issued in EP Application No. 11870032.7 on Nov. 21, 2014; 5 pages.
"1Password-Anleitung"; XP055152915; Retrieved from the Internet: URL:ftp.ashshop.de/downloads/1Password-Anleitung.pdf; Dec. 8, 2009; pp. 147-148.

* cited by examiner

SYSTEM, DEVICE, AND METHOD FOR AUTHENTICATION OF A USER ACCESSING AN ON-LINE RESOURCE

CROSS-REFERENCE TO RELATED APPLICATION

This application is a national phase application of International Application Number PCT/CA2011/050467, which has an international filing date of Jul. 28, 2011, and which is entirely incorporated by reference herein.

FIELD OF THE INVENTION

This invention relates to a device, system and computer-implemented method for authenticating a user of a computing device.

BACKGROUND OF THE INVENTION

A user accessing an on-line resource is typically required to authenticate their identity by entering credentials such as a username and an associated password. The on-line resource compares the authentication with its records and, if there is a match, authenticates the user to allow access to the on-line resource.

In practice, this requires the user to either remember different sets of authentication information, one set associated with each on-line resource, re-use log-in credentials for multiple on-line resources or record the authentication and associated on-line resource identifying information in a safe location.

There is a need for a system, devices and method for avoiding limitations in the prior art.

BRIEF DESCRIPTION OF THE DRAWINGS

In drawings which illustrate by way of example only a preferred embodiment of the invention.

DETAILED DESCRIPTION OF THE INVENTION

Figure 1:
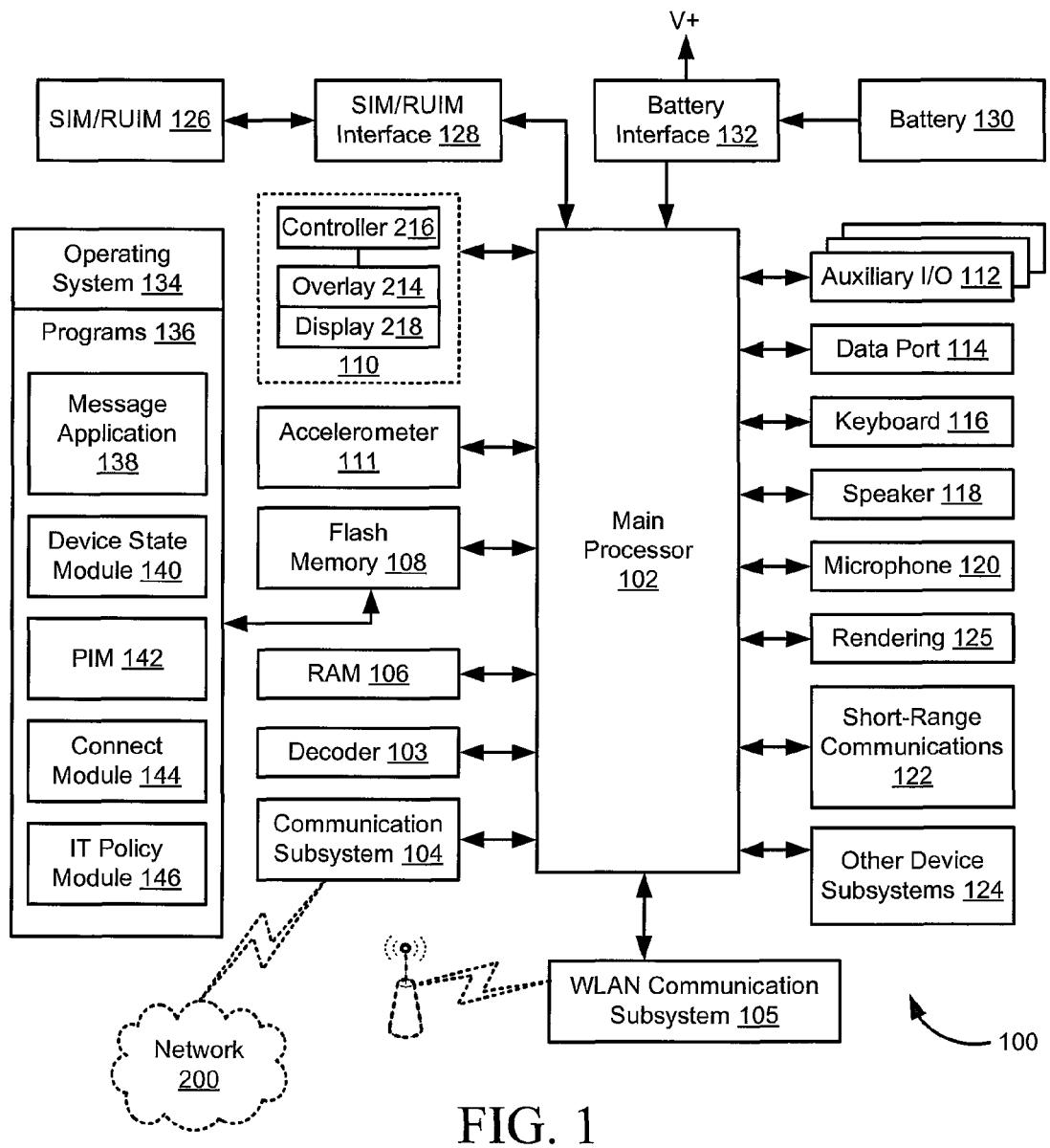
FIG. 1 is a block diagram of an embodiment of a mobile communication device.

A system, devices and method are providing for secure authentication of a user accessing an on-line resource.

In an embodiment, a computing device implemented method is provided for providing credentials required for access to an on-line resource available over a network. The method may comprise the computing device: connecting to the on-line resource over the network to register a user of the computing device, the on-line resource identified by an on-line resource identifier; receiving from the on-line resource at least one request for a credential to identify a user of the computing device, each of the at least one request further comprising a request identifier; for each of the at least one request: generating a random credential, storing the random credential in association with the on-line resource identifier and the request identifier in a data store accessible to the computing device and, submitting the random credential to the on-line resource to register the user.

In an aspect, before the generating, the method may further comprise: receiving a user credential through a user input interface of the computing device; and, storing the user credential in association with the resource identifier. In an aspect, after the computing device has submitted the random credential to the on-line resource and the user has been registered, the method may further comprise receiving an instruction to access the on-line resource through the user input interface; connecting to the on-line resource over the network and submitting a request for access; receiving from the on-line resource the at least one request for a credential to identify a user of the computing device, each of the at least one request further comprising the request identifier; comparing each of the at least one request with the request identifiers stored in the data store in association with the on-line resource identifier for the on-line resource to identify the associated random credential; and, submitting each of the at least one associated random credential to the on-line resource to gain access to the on-line resource. In an aspect, before submitting each of the at least one associated random credential to the on-line resource, the method may further comprise: soliciting a confirmation user credential from the user; receiving the confirmation user credential through the user input interface; comparing the confirmation user credential with the user credential stored in association with the resource identifier; and, when the confirmation user credential matches the stored user credential, submitting each of the at least one associated random credential to the on-line resource.

In an aspect, the storing may further comprise storing a date the random credential was generated in association with the random credential, and wherein after the user is registered, the method further comprising: checking the stored date for comparison with an update time; and, when the stored date meets the update time, connecting to the on-line resource to update the random credential to identify the user.

In an aspect, the request identifier may comprise a content entry field identifier of a registration portal webpage sent from the on-line resource, and the method may further comprise: identifying the content entry field identifier from the webpage; and, saving the content entry field identifier as the request identifier.

In an aspect, the at least one request for a credential may comprise a request for at least one of a username, password, challenge question or challenge answer.

In an aspect, the computing device may comprise a mobile wireless communications device.

In an aspect, after the computing device has submitted the random credential to the on-line resource and the user has been registered, the method may further comprise: receiving an instruction to access the on-line resource from a requesting device, the requesting device seeking access to the on-line resource and the instruction including the on-line resource identifier and one or more request identifiers; matching the received on-line resource identifier and one or more request identifiers with the stored on-line resource identifier and stored request identifiers in the data store to identify the associated random credential for each of the one or more request identifiers stored; and, forwarding the one or more request identifiers and associated random credentials to the requesting device for submission to the on-line resource. In an aspect, before forwarding the one or more request identifiers and associated random credentials to the requesting device, the method may further comprise: soliciting a confirmation user credential from the user; receiving the confirmation user credential through the user input interface; comparing the confirmation user credential with the user credential stored in association with the resource identifier; and, when the confirmation user credential matches the stored user credential, forwarding the one or more request identifiers and associated random credentials to the requesting device.

In an embodiment, a computing device may be provided that is operative to execute any of the above methods.

In an embodiment, a system may be provided. The system may comprise the computing device of claim 11 and a host server accessible on the network, the host server operative to: receive registration information stored by the computing device in the data store, the registration information comprising the random credential stored in association with the on-line resource identifier and the request identifier; store the registration information in a data store accessible to the host server; and, transmit the registration information to a replacement computing device. In an aspect, the host server may be further operative to: store the registration information in encrypted form; and, transmit a cryptographic key to the replacement computing device with the encrypted registration information, the cryptographic key operative with a cryptographic algorithm executed by the replacement computing device to decrypt the registration information.

Figure 2:
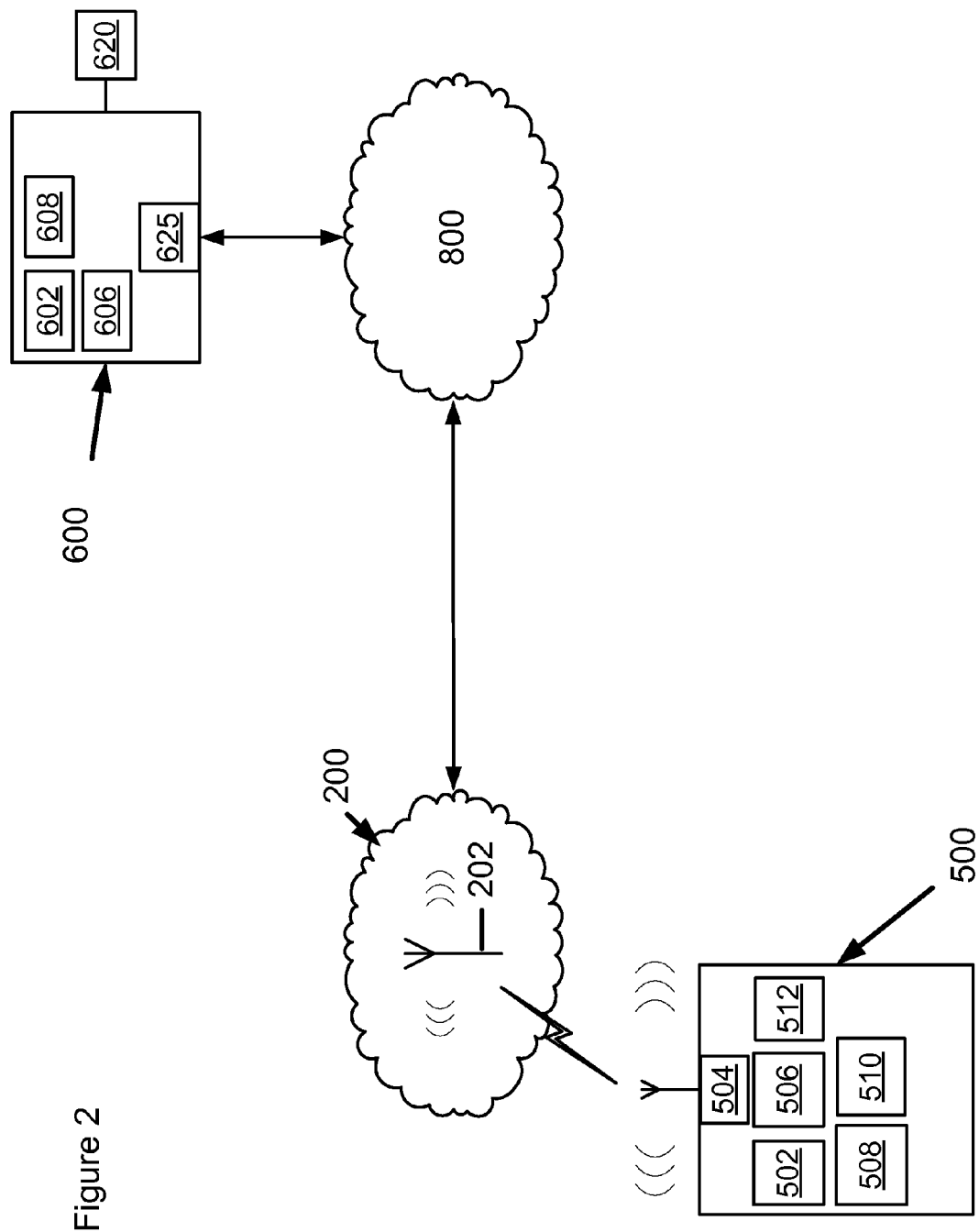
FIG. 2 is a block diagram illustrating an embodiment of a system for registering and authenticating a user.

The embodiments described herein may be implemented on a mobile communication device such as that illustrated in FIGS. 1 and 2. The mobile communication device 100 may communicate with other devices over a wireless communication system or enterprise system. The mobile communication device 100 may also communicate with other devices over a short-range communication means such as short-range wireless communications such as Bluetooth™, Infrared, or Wi-Fi, or using a short-range physical link such as a USB cable. The mobile communication device 100 can also have voice communication capabilities, typically delivered through the wireless communication system.

FIG. 1 is a block diagram of an exemplary embodiment of a mobile communication device 100. The mobile communication device 100 includes a number of components such as a main processor 102 that controls the overall operation of the mobile communication device 100. Communication functions, including data and voice communications, are performed through a communication subsystem 104. Data received by the mobile communication device 100 can be decompressed and decrypted by decoder 103, operating according to any suitable decompression techniques, and encryption/decryption techniques according to various standards, such as Data Encryption Standard (DES), Triple DES, or Advanced Encryption Standard (AES)). Image data is typically compressed and decompressed in accordance with appropriate standards, such as JPEG, while video data is typically compressed and decompressed in accordance with appropriate standards, such as H.26x and MPEG-x series standards.

The communication subsystem 104 receives messages from and sends messages to a wireless network 200. In this exemplary embodiment of the mobile communication device 100, the communication subsystem 104 is configured in accordance with one or more of Global System for Mobile Communication (GSM), General Packet Radio Services (GPRS) standards, Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM, GPRS, EDGE, or UMTS, and optionally other network communications. With newer network protocols, these channels are capable of supporting both circuit switched voice communications and packet switched data communications.

Other wireless networks can also be associated with the mobile communication device 100 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, third-generation (3G) networks like EDGE and UMTS. Some other examples of data-centric networks include WiFi 802.11™, Mobitex™ and DataTAC™ network communication systems. Examples of other voice-centric data networks include Personal Communication Systems (PCS) networks like GSM and Time Division Multiple Access (TDMA) systems. The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range wireless communications 122 and other device subsystems 124.

Some of the subsystems of the mobile communication device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list.

A rendering circuit 125 is included in the device 100. When a user specifies that a data file is to be viewed on the display 110, the rendering circuit 125 analyzes and processes the data file for visualization on the display 110. Rendering circuit 125 may be implemented as hardware, software, or as a combination of both hardware and software.

The mobile communication device 100 can send and receive communication signals over the wireless network 200 after required network registration or activation procedures have been completed. Network access is associated with a subscriber or user of the mobile communication device 100. To identify a subscriber, the mobile communication device 100 requires a SIM/RUIM card 126 (i.e. Subscriber Identity Module or a Removable User Identity Module) to be inserted into a SIM/RUIM interface 128 in order to communicate with a network. The SIM/RUIM card 126 is one type of a conventional "smart card" that can be used to identify a subscriber of the mobile communication device 100 and to personalize the mobile communication device 100, among other things. Without the SIM/RUIM card 126, the mobile communication device 100 is not fully operational for communication with the wireless network 200. By inserting the SIM/RUIM card 126 into the SIM/RUIM interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM/RUIM card 126 includes a processor and memory for storing information. Once the SIM/RUIM card 126 is inserted into the SIM/RUIM interface 128, it is coupled to the main processor 102. In order to identify the subscriber, the SIM/RUIM card 126 can include some user parameters such as an International Mobile Subscriber Identity (IMSI). An advantage of using the SIM/RUIM card 126 is that a subscriber is not necessarily bound by any single physical mobile device. The SIM/RUIM card 126 can store additional subscriber information for a mobile device as well, including datebook (or calendar) information and recent call information. Alternatively, user identification information can also be programmed into the flash memory 108.

The mobile communication device 100 may be a battery-powered device including a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile communication device 100. Although current technology makes use of a battery, future technologies such as micro fuel cells can provide the power to the mobile communication device 100.

The mobile communication device 100 also includes an operating system 134 and software components 136 to 146 which are described in more detail below. The operating system 134 and the software components 136 to 146 that are executed by the main processor 102 are typically stored in a persistent store such as the flash memory 108, which can alternatively be a read-only memory (ROM) or similar storage element (not shown). Those skilled in the art will appreciate that portions of the operating system 134 and the software components 136 to 146, such as specific device applications, or parts thereof, can be temporarily loaded into a volatile store such as the RAM 106. Other software components can also be included, as is well known to those skilled in the art.

The subset of software applications 136 that control basic device operations, including data and voice communication applications, will normally be installed on the mobile communication device 100 during its manufacture. Other software applications include a message application 138 that can be any suitable software program that allows a user of the mobile communication device 100 to send and receive electronic messages. Various alternatives exist for the message application 138 as is well known to those skilled in the art. Messages that have been sent or received by the user are typically stored in the flash memory 108 of the mobile communication device 100 or some other suitable storage element in the mobile communication device 100. In at least some embodiments, some of the sent and received messages can be stored remotely from the device 100 such as in a data store of an associated host system that the mobile communication device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile communication device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items can be seamlessly integrated, synchronized, and updated via the wireless network 200 with the mobile device subscriber's corresponding data items stored and/or associated with a host computer system. This functionality creates a mirrored host computer on the mobile communication device 100 with respect to such items. This can be particularly advantageous when the host computer system is the mobile device subscriber's office computer system.

The mobile communication device 100 also includes a connect module 144, and an information technology (IT) policy module 146. The connect module 144 implements the communication protocols that are required for the mobile communication device 100 to communicate with the wireless infrastructure and any host system, such as an enterprise system, that the mobile communication device 100 is authorized to interface with. Examples of a wireless infrastructure and an enterprise system are given in FIGS. 3 and 4, which are described in more detail below.

The connect module 144 includes a set of Application Programming Interfaces (APIs) that can be integrated with the mobile communication device 100 to allow the mobile communication device 100 to use any number of services associated with the enterprise system. The connect module 144 allows the mobile communication device 100 to establish an end-to-end secure, authenticated communication pipe with the host system. A subset of applications for which access is provided by the connect module 144 can be used to pass IT policy commands from the host system to the mobile communication device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be installed on the mobile communication device 100. These software applications can be third party applications, which are added after the manufacture of the mobile communication device 100. Examples of third party applications include games, calculators, utilities, etc.

The additional applications can be loaded onto the mobile communication device 100 through at least one of the wireless network 200, the auxiliary I/O subsystem 112, the data port 114, the short-range wireless communications subsystem 122, or any other suitable device subsystem 124. This flexibility in application installation increases the functionality of the mobile communication device 100 and can provide enhanced on-device functions, communication-related functions, or both. For example, secure communication applications can enable electronic commerce functions and other such financial transactions to be performed using the mobile communication device 100.

The data port 114 enables a subscriber to set preferences through an external device or software application and extends the capabilities of the mobile communication device 100 by providing for information or software downloads to the mobile communication device 100 other than through a wireless communication network. The alternate download path can, for example, be used to load an encryption key onto the mobile communication device 100 through a direct and thus reliable and trusted connection to provide secure device communication. The data port 114 can be any suitable port that enables data communication between the mobile communication device 100 and another computing device. The data port 114 can be a serial or a parallel port.

In some instances, the data port 114 can be a USB port that includes data lines for data transfer and a supply line that can provide a charging current to charge the battery 130 of the mobile communication device 100.

The short-range wireless communications subsystem 122 provides for communication between the mobile communication device 100 and different systems or devices, without the use of the wireless network 200. For example, the subsystem 122 can include an infrared device and associated circuits and components for short-range communication. Examples of short-range communication standards include standards developed by the Infrared Data Association (IrDA), Bluetooth™, and the 802.11™ family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as: a touchscreen, mouse, track ball, infrared fingerprint detector, or a roller wheel with dynamic button pressing capability. The keyboard 116 is preferably an alphanumeric keyboard and/or telephone-type keypad. However, other types of keyboards can also be used. A composed item can be transmitted over the wireless network 200 through the communication subsystem 104. It will be appreciated that if the display 110 comprises a touchscreen, then the auxiliary subsystem 112 may still comprise one or more of the devices identified above.

For voice communications, the overall operation of the mobile communication device 100 is substantially similar, except that the received signals are output to the speaker 118, and signals for transmission are generated by the microphone 120. Alternative voice or audio I/O subsystems, such as a voice message recording subsystem, can also be implemented on the mobile communication device 100. Although voice or audio signal output is accomplished primarily through the speaker 118, the display 110 can also be used to provide additional information such as the identity of a calling party, duration of a voice call, or other voice call related information.

In an aspect, a computing device program product may be provided for execution on the computing device 100, the computing device program product rendering the computing device 100 operative to carry out steps of the method. In an embodiment, the computing device program product may comprise computer readable program code means embodied on a storage medium such as an optical disc, hard disc or other non-transitory memory.

The communication subsystem 104 includes a receiver, a transmitter, as well as associated components such as one or more embedded or internal antenna elements, Local Oscillators (LOs), and a processing module such as a Digital Signal Processor (DSP). The particular design of the communication subsystem 104 is dependent upon the communication network 200 with which the mobile communication device 100 is intended to operate.

Signals received by the antenna through the wireless network 200 are input to the receiver, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP. In a similar manner, signals to be transmitted are processed, including modulation and encoding, by the DSP. These DSP-processed signals are input to the transmitter for digital-to-analog (D/A) conversion, frequency up conversion, filtering, amplification and transmission over the wireless network 200 via the antenna. The DSP not only processes communication signals, but also provides for receiver and transmitter control. For example, the gains applied to communication signals in the receiver and the transmitter can be adaptively controlled through automatic gain control algorithms implemented in the DSP.

The wireless link between the mobile communication device 100 and the wireless network 200 can contain one or more different channels, typically different RF channels, and associated protocols used between the mobile communication device 100 and the wireless network 200. An RF channel is a limited resource that should be conserved, typically due to limits in overall bandwidth and limited battery power of the mobile communication device 100. When the mobile communication device 100 is fully operational, the transmitter is typically keyed or turned on only when it is transmitting to the wireless network 200 and is otherwise turned off to conserve resources. Similarly, the receiver is periodically turned off to conserve power until it is needed to receive signals or information (if at all) during designated time periods.

Referring to FIG. 2 there is an exemplary embodiment comprising a computing device 500, such as mobile communication device 100, connected to a public or private network such as the network 800. Computing device 500 could be any computer which a user is utilising to navigate the network 800 to access an on-line resource, for instance through a web browser. In the embodiment illustrated, computing device 500 comprises a mobile wireless computing device that communicates to the network 500 through a wireless network 200.

In a typical embodiment, computing device 500 includes a processor 502 that communicates with RAM 506 and non-transitory storage memory 508 to execute a software program product, such as a web browser, to enable computing device 500 to communicate with the network 800 and access the on-line resource, such as a web server 600 connected to the network 800 by a communication means 625 such as a modem or Ethernet card. The web server 600, enabled by program code executing on the web server processor 602 in communication with web server RAM 606 and web server storage memory 608, will access content stored in web server storage memory 608, or a connected memory archive 620, and deliver the content to the computing device 500.

Computing device 500 further comprises a user input interface 510 such as a keyboard, mouse or touch screen for receiving input from a user, a network communication subsystem 504 for communications between the communication device 500 and the network 800.

When the user instructs the device 500 to access an on-line resource, the computing device 500 is operative to send an on-line resource request for content to the on-line resource, such as web server 600.

In applications where the content is an authentication portal for authenticating the user before delivering content intended for the user, or re-directing the user to another on-line resource, the first content delivered to the computing device 500 may comprise a user authentication portal. A user authentication portal may be presented as a web page that receives credentials, the web page may comprise content entry fields such as a credential input field for the user to enter a user credential and a password input field for the user to enter an associated user password that is associated with the user's credential. Typically, each content entry field may further comprise a content entry field identifier for identifying a type of content to be entered into that content entry field.

In an embodiment, the computing device 500 is operative to automatically enter credentials into the content entry fields using information stored in a data store accessible to the computing device 500, such as secure data store 512. Secure data store 512 may comprise a separate memory from non-transitory memory 508 or may comprise a portion of the non-transitory memory 508. In either case, secure data store 512 preferably comprises credentials stored in a first encrypted form, and the computing device 500 is operative to decrypt the encrypted credentials before entering the decrypted credentials into the content entry fields. In an aspect, the computing device 500 may be operative to enter the credentials after a user of the computing device 500 has provided an actionable input through a user interface of the computing device 500, for instance by actuating a user input button of the computing device 500 or pressing a specified area of a touch screen of the computing device 500.

In embodiments where a secure connection is established between the device and the web server 600, the decrypted user credential and the associated user password may be encrypted in a second encrypted form by the computing device 500 before the data is transmitted to the web server 600. The second encrypted form being determined by a security protocol mutually agreed upon by the computing device 500 and the web server 600 when the secure connection was initially established. The second encrypted form in part generated by a common encryption algorithm and cryptographic key information shared by the computing device 500 and the web server 600. Preferably, the first encrypted form being generated according to an encryption algorithm and/or cryptographic key information that is not known by the web server 600.

According to an embodiment, an on-line registration method may be employed wherein the computing device 500 generates random credentials to transmit to the web server 600 to register the user as an authenticated user of the requested on-line resource. The computing device 500 may connect to the on-line resource hosted by the web server 600 over the network to register a user of the computing device 500. The computing device 500 may initially receive an instruction through a user input interface of the computing device 500 from the user to access the on-line resource. The instruction may include an on-line resource identifier that identifies the on-line resource.

After connection to the on-line resource, the computing device 500 may receive from the on-line resource at least one request for a credential to identify a user of the computing device 500. The at least one request may include a request identifier. For instance, a content entry field may be presented on a web page provided by the on-line resource. The content entry field may further be associated with a content entry field identifier that identifies the type of content expected for entry in the content entry field. Examples of types of content include a user credential, password or other user identifying information.

In an aspect, the content entry field may comprise a challenge answer and the content entry field identifier may comprise a challenge question. Typically, a challenge question may solicit personal information from a user and the challenge answer may comprise personal information, preferably private, relatively unique and within the personal knowledge of a user, in response to the challenge question. Accordingly, for future user authentication the on-line resource may present the challenge question to the user and the user may supply the challenge answer. Since the challenge answer is private and preferably relatively unique, unauthorized users will not know the challenge answer in response to the challenge question. A drawback of the conventional approach is that the on-line resource now maintains a record of the user's personal information. Further, multiple on-line resources may solicit similar private information such as: a mother's maiden name, an age, a previous address, a sibling's name or birthday, etc.

In an aspect, the present method provides that for each request, the computing device 500 may generate a random credential. Accordingly, while the on-line resource may be soliciting a credential that comprises personal information, the computing device 500 generates the random credential to supply in response to the request.

The random credential may comprise, for instance, a binary string at least 128 bits in length; an ASCII string of at least 16 characters; or, a binary/ASCII string of a bit length as specified by the on-line resource. The length of the string may be selected based upon a security evaluation of a number of available characters and a minimum string length of those characters to make guessing the string difficult given either a limited number of trials or a minimum time to submit a guess in a brute force attack. The random credential may be generated by hardware or software means available to the computing device 500.

The computing device 500 may store the random credential in association with the on-line resource identifier and the request identifier in a data store accessible to the computing device 500. In an aspect, multiple request identifiers may be associated with the on-line resource identifier and the user of the computing device 500. Preferably, the data store comprises a secure data store as described above.

The computing device 500 may submit the random credential to the on-line resource to register the user. Once the user has been registered, the on-line resource is able to authenticate the user by requesting a credential from the user and comparing a received credential submitted in response to the request with the credentials collected during the registration process.

Accordingly, the on-line resource may seek to register or authenticate a user by requesting at least one credential that may comprise a request for identifying information, such as a username or password, or personal information such as a by presenting a challenge question to request a challenge answer that may typically comprise personal information of the user.

In an aspect, the computing device 500 may be operative to obtain a user credential from the user during the registration process. The user credential, such as a device password or PIN, may be stored in association with the resource identifier for the generated random credential and/or the request identifier for which the random credential was generated. The stored user credential may be subsequently used by the computing device 500 to authenticate a user at the time of authentication with the on-line resource. In an aspect, a supplied user credential may be operative to authenticate a user once for all random credentials associated with the resource identifier.

In an aspect, the computing device 500 may be used to authenticate a user seeking access to an on-line resource. For instance, the computing device 500 may receive a request to access an on-line resource. In an embodiment, the request may be received as an instruction from a user through a user input interface of the computing device 500. The computing device 500 may connect to the on-line resource over the network 800 and submit a request for access. The on-line resource may respond to the request for access with at least one request for a credential to identify a user of the computing device 500. For instance, the at least one request may comprise a user name and a password. Alternatively, the at least one request may comprise a challenge question, soliciting a challenge answer from the user. The at least one request may further comprise a request identifier, such as the content entry field identifier described above.

The computing device 500 may compare each request identifier sent by the on-line resource with request identifiers stored in the data store in association with the on-line resource identifier to identify the random credential associated with each of the request identifiers. The computing device 500 may submit, for each request identifier sent by the on-line resource, the associated random credential stored in the data store. When the correct random credential(s) is submitted to the on-line resource, the user may gain access to the on-line resource through the computing device 500.

Figure 3:
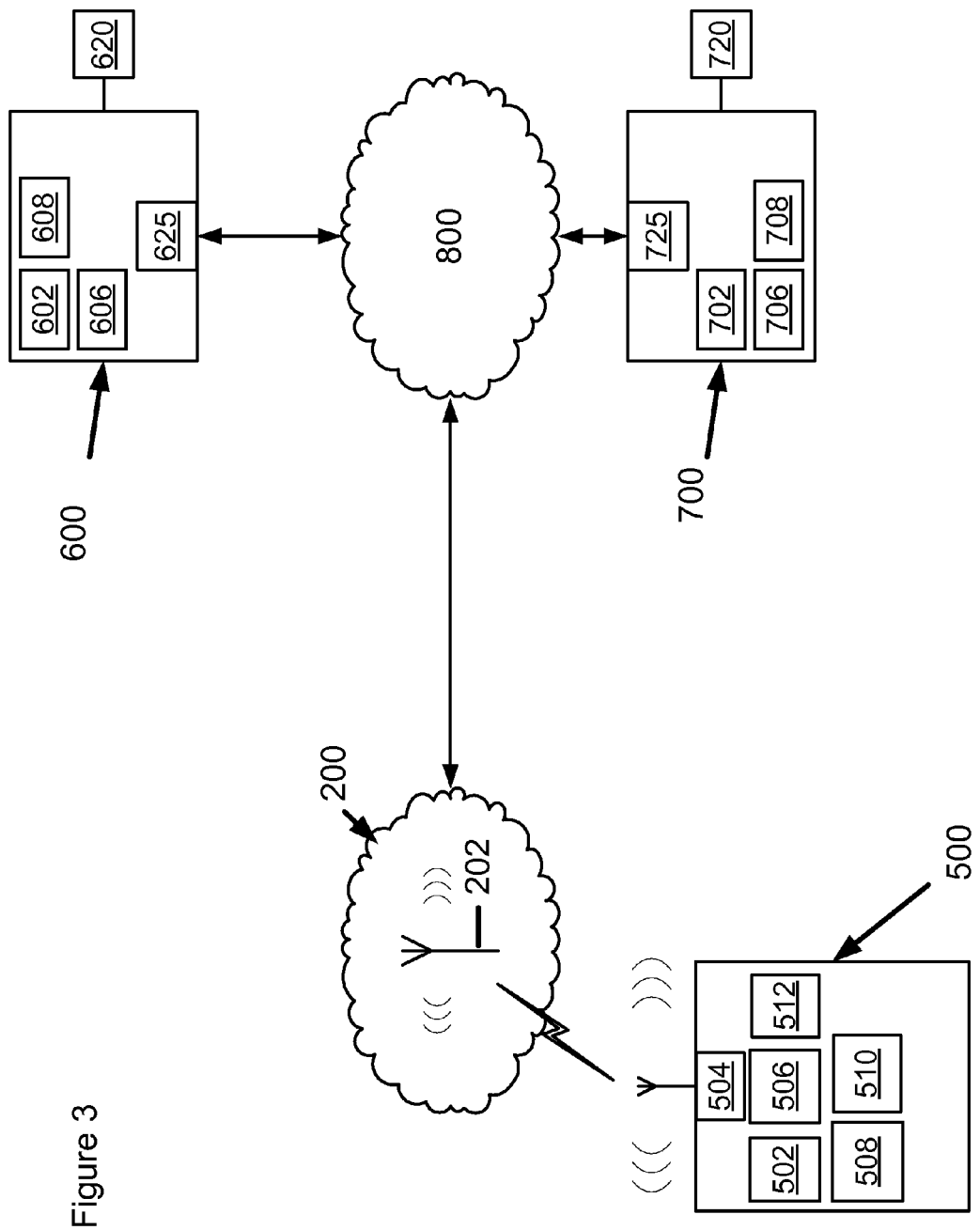
FIG. 3 is a block diagram illustrating another embodiment of a system for registering authenticating a user.

In an alternate embodiment, illustrated in FIG. 3, the request may be received from a requesting device 700 in communication with the computing device 500 over the network 800. The requesting device 700 may be connected to the network 800 by a communication means 725 such as a modem or Ethernet card. The requesting device 700, enabled by program code executing on the requesting device processor 702 in communication with requesting device RAM 706 and requesting device storage memory 708, may be used by the user to access content available on the web server 600 with the assistance of the computing device 500.

In the alternate embodiment, a user of the requesting device 700 may seek access to the on-line resource. The requesting device 700 may connect to the on-line resource over the network 800 to request access and receive an authentication portal in response to the request for access. The requesting device 700 may then forward an instruction to access the on-line resource to the computing device 500. The instruction may include the on-line resource identifier of the on-line resource to be accessed and one or more request identifiers obtained from the authentication portal received from the on-line resource. The computing device 500 being a personal device of the user, and preferably in the possession of the user at the time of the request.

The computing device 500, upon receiving the instruction to access the on-line resource, may compare the received on-line resource identifier and the one or more request identifiers with information stored in the data store to match the received information with the corresponding on-line resource identifier and request identifiers stored in the data store to identify the random credential associated with each of the one or more request identifiers. The computing device 500 may forward the one or more request identifiers and the associated random credentials matched by the computing device 500 from the data store to the requesting device 700. The requesting device 700 may then submit the associated random credential corresponding to each request to the on-line resource to allow the user to gain access.

In an embodiment, the computing device 500 may be operative to require the user to enter a user credential into the computing device 500 before submitting the associated random credentials to the on-line resource or forwarding the associated random credentials to the requesting device 700. The requirement ensures that the computing device 500 is in the possession of the user initiating the on-line resource request on the requesting device 700.

In the embodiment, the computing device 500 may solicit a confirmation user credential from the user. The computing device 500 may solicit the confirmation user credential by, for instance, emitting an audible tone and/or a visual cue through user interface(s) of the computing device 500. In response to the solicitation, the computing device 500 may receive the confirmation user credential through a user input interface of the computing device 500. If the computing device 500 does not receive the confirmation user credential within a pre-determined time period, the computing device 500 may terminate the operation.

The computing device 500 may compare the confirmation user credential with the user credential stored in association with the request identifier in the data store. When the confirmation user credential matches the stored user credential, the computing device 500 has confirmed that a user of the computing device 500 has been authenticated. The computing device 500 may then submit the associated random credentials to either the on-line resource or the requesting device 700, as the case may be.

In an aspect, the computing device 500 may be operative to automatically update a user's authentication credentials after a period of time has passed. In an aspect, the authentication credentials may comprise the random credentials. The computing device 500 may be operative to receive as input from a user a duration or time period specifying a lifetime for a set of credentials. Upon expiry of the time period, the computing device 500 may be operative to prompt the user for a new set of credentials or automatically generate a replacement random credential, as the case may be, for registration with the on-line resource. Accordingly, the refreshing of credentials may be controlled by a user of the computing device, rather than relying upon the on-line resource to prompt a change.

In an aspect, the computing device 500 may be operative to store a date a credential was generated and associate the stored date with the credential in the data store. The computing device 500 may then periodically check the stored date for comparison with an update time. The update time may be a default period or may be selected by the user. When the stored date meets the update time, the computing device 500 may be operative to connect to the on-line resource to update the credential. In an aspect, the credential may comprise a random credential. In an aspect, the computing device 500 may be further operative to generate a fresh random credential for registration with the on-line resource.

In an aspect, the computing device 500 may be operative to store a date a random credential was generated and associate the stored date with the random credential in the data store. The computing device 500 may then check the stored date for comparison with an update time the next time a request is made for random credential. After supplying the random credential to satisfy the request, the computing device 500 may generate a fresh random credential and register it with the on-line resource.

In an aspect, the on-line resource may present a user registration portal, such as a webpage, that solicits content from a user. The user registration portal may typically be composed of one or more content entry fields, each field associated with a content entry field identifier such as a field title. The computing device 500 may be operative to process the registration portal webpage sent from the on-line resource to identify the content entry field identifier(s) from the webpage. The identified content entry field identifier(s) may each be stored as a request identifier.

When a computing device 500 responds to a subsequent authentication request, the computing device 500 may locate content entry fields in a corresponding authentication portal and match the content entry field identifiers from the authentication portal with the request identifiers stored from the registration portal. The associated random credentials may be submitted into the appropriate content entry fields of the authentication portal as identified by the content entry field identifiers on the authentication portal.

In an aspect, the computing device 500 may be operative to present a user selectable command field for selection by a user of the computing device 500 to indicate that the user would like the computing device 500 to generate random credentials, such as a user credential and an associated password, as registration credentials for a web site currently being viewed by the user on the device 500. The user selectable command field may comprise, for instance, a tab of a web browser operable on the computing device 500.

Upon the user selecting the selectable command field, the computing device 500 may be operative to generate random registration credentials, for instance by adding a salt (random number string) to a seed value, such as a current username, and hashing the salted seed value to generate the random registration credentials. Alternatively, the random registration credentials may be selected according to another method such as generating a random alphanumeric string according to known methods.

The computing device 500 may then encrypt the generated random registration credentials in a first encryption form and store the encrypted data in a secure data store 512 of the computing device 500. The encrypted random registration credentials may be associated with an on-line resource, such as a website, for instance by including an on-line resource identifier such as an address of the web site.

The random registration credentials may be entered into fields of a registration portal web page being viewed by the user, or optionally may be directly submitted to the on-line resource hosted by web server 600 without display of the registration portal web page on the computing device 500.

In an embodiment a system is provided where a host server is available on the network 800 to securely store the registration information maintained by the computing device 500 for registration and authentication. The registration information may include, for instance, the random credential stored in association with the on-line resource identifier and the request identifier in the data store accessible to the computing device 500. The system provides a back-up mechanism whereby if a computing device 500 is no longer operable for a user, a replacement computing device 500 may be initialised with the registration information.

Accordingly, the host server may store the registration information in a data store accessible to the host server and, transmit the registration information to the replacement computing device when required.

In an aspect, the registration information may be stored in encrypted form on the host server. Preferably, the host server may be further operative to transmit a cryptographic key to the replacement computing device along with the encrypted registration information, the cryptographic key operative with a cryptographic algorithm executed by the replacement computing device to decrypt the registration information.

Various embodiments of the present invention having been thus described in detail by way of example, it will be apparent to those skilled in the art that variations and modifications may be made without departing from the invention. The invention includes all such variations and modifications as fall within the scope of the appended claims.

We claim:

1. A method comprising:
   connecting a computing device to an on-line resource over a network to register a user of the computing device, the on-line resource identified by an on-line resource identifier;
   receiving, at the computing device, from the on-line resource, at least one registration credential request for a credential to use in registering the user with the on-line resource, each of the at least one registration credential request comprising a registration credential request identifier;
   in response to receiving the at least one registration credential request, for each of the at least one registration credential request:
      automatically generating, at the computing device, a random credential that satisfies one or more criteria associated with the registration credential request;
      storing, at the computing device, the automatically generated random credential in association with the on-line resource identifier and the registration credential request identifier in a data store accessible to the computing device; and
      submitting, from the computing device, the automatically generated random credential to the on-line resource as a response to the registration credential request; and
   after the computing device has submitted the automatically generated random credential to the on-line resource:
      receiving a request to access the on-line resource through a user input interface of the computing device;
      receiving, at the computing device, from the on-line resource, at least one authentication credential request;
      identifying, for each of the at least one authentication credential request, the random credential associated with the authentication credential request; and
      submitting at least one associated random credential to the on-line resource to gain access to the on-line resource.

2. The method of claim 1 wherein before the generating, the method further comprises:
   receiving a user credential through a user input interface of the computing device; and,
   storing the user credential in association with the on-line resource identifier.

3. The method of claim 1, wherein the at least one authentication credential request is received at the computing device in response to the request for access to the on-line resource, wherein each of the at least one authentication credential comprises an authentication credential request identifier, and wherein the identifying comprises:
   comparing each of the at least one authentication credential request identifier with the registration credential request identifiers stored in the data store in association with the on-line resource identifier for the on line resource to identify the random credentials associated with each of the authentication credential requests.

4. The method of claim 1 wherein before submitting the at least one associated random credential to the on-line resource, the method further comprises:

soliciting a confirmation user credential from the user;
receiving the confirmation user credential through the user input interface;
comparing the confirmation user credential with the user credential stored in association with the on-line resource identifier; and,
when the confirmation user credential matches the stored user credential, submitting each of the at least one associated random credential to the on-line resource.

5. The method of claim 1 wherein the storing further comprises storing a date on which the random credential was generated in association with the random credential, and wherein after the user is registered, the method further comprises:
checking the stored date for comparison with an update period; and,
when the update period has elapsed since the stored date, connecting to the on-line resource to update the random credential to identify the user.

6. The method of claim 1 wherein the registration credential request identifier comprises a content entry field identifier of a registration portal webpage sent from the on-line resource, the method further comprises:
identifying the content entry field identifier from the webpage; and,
saving the content entry field identifier as the registration credential request identifier.

7. The method of claim 1 wherein the at least one registration credential request comprises a request for at least one of a username, password, challenge question or challenge answer.

8. The method of claim 1 wherein the computing device comprises a mobile wireless communications device.

9. The method of claim 1 wherein after the computing device has submitted the random credential to the on-line resource and the user has been registered, the method further comprises:
receiving an instruction to access the on-line resource from a requesting device, the requesting device seeking access to the on-line resource and the instruction including the on-line resource identifier and one or more authentication credential request identifiers;
matching the received on-line resource identifier and one or more authentication credential request identifiers with the stored on-line resource identifier and stored registration credential request identifiers in the data store to identify the associated random credential for each of the one or more authentication credential request identifiers; and,
forwarding the one or more authentication credential request identifiers and associated random credentials to the requesting device for submission to the on-line resource.

10. The method of claim 9 wherein before forwarding the one or more authentication credential request identifiers and associated random credentials to the requesting device, the method further comprises:
soliciting a confirmation user credential from the user;
receiving the confirmation user credential through the user input interface;
comparing the confirmation user credential with the user credential stored in association with the on-line resource identifier; and,
when the confirmation user credential matches the stored user credential, forwarding the one or more authentication credential request identifiers and associated random credentials to the requesting device.

11. A computing device, comprising:
one or more processors; and
a non-transitory computer-readable storage medium coupled to the one or more processors and storing programming instructions for execution by the one or more processors, the programming instructions instruct the one or more processors to:
connect to an on-line resource over a network to register a user of the computing device, the on-line resource identified by an on-line resource identifier;
receive, from the on-line resource, at least one registration credential request for a credential to use in registering the user with the on-line resource, each of the at least one registration credential request comprising a registration credential request identifier;
in response to receiving the at least one registration credential request, for each of the at least one registration credential request:
automatically generate a random credential that satisfies one or more criteria associated with the registration credential request;
store the automatically generated random credential in association with the on-line resource identifier and the registration credential request identifier in a data store accessible to the computing device; and
submit the automatically generated random credential to the on-line resource as a response to the registration credential request; and
after submitting the automatically generated random credential to the on-line resource:
receive a request to access the on-line resource through a user input interface of the computing device;
receive, from the on-line resource, at least one authentication credential request;
identify, for each of the at least one authentication credential request, the random credential associated with the authentication credential request; and
submit at least one associated random credential to the on-line resource to gain access to the on-line resource.

12. The computing device of claim 11, wherein before the generating, the computing device is configured to:
receive a user credential through a user input interface of the computing device; and
store the user credential in association with the on-line resource identifier.

13. The computing device of claim 11, wherein the at least one authentication credential request is received in response to the request for access to the on-line resource, wherein each of the at least one authentication credential comprises an authentication credential request identifier, and wherein the identifying comprises:
comparing each of the at least one authentication credential request identifier with the registration credential request identifiers stored in the data store in association with the on-line resource identifier to identify the random credentials associated with each of the authentication credential requests.

14. The computing device of claim 11, wherein before submitting the at least one associated random credential to the on-line resource, the computing device is configured to:
solicit a confirmation user credential from the user;
receive the confirmation user credential through the user input interface;
compare the confirmation user credential with the user credential stored in association with the on-line resource identifier; and when the confirmation user credential matches the stored user credential, submit each of the at least one associated random credential to the on-line resource.

15. The computing device of claim 11, wherein the storing further comprises storing a date on which the random credential was generated in association with the random credential, and wherein after the user is registered, the computing device is further configured to:
check the stored date for comparison with an update period; and
when the update period has elapsed since the stored date, connect to the on-line resource to update the random credential to identify the user.

16. The computing device of claim 11, wherein the registration credential request identifier comprises a content entry field identifier of a registration portal webpage sent from the on-line resource, the computing device further configured to:
identify the content entry field identifier from the webpage; and
save the content entry field identifier as the registration credential request identifier.

17. The computing device of claim 11, wherein the at least one registration credential request comprises a request for at least one of a username, password, challenge question or challenge answer.

18. A system comprising:
a computing device to:
connect the computing device to an on-line resource over a network to register a user of the computing device, the on-line resource identified by an on-line resource identifier;
receive, at the computing device, from the on-line resource, at least one registration credential request for a credential to use in registering the user with the on-line resource, each of the at least one registration credential request comprising a registration credential request identifier;
in response to receiving the at least one registration credential request, for each of the at least one registration credential request:
automatically generate, at the computing device, a random credential that satisfies one or more criteria associated with the registration credential request;
store the automatically generated random credential in association with the on-line resource identifier and the registration credential request identifier in a data store accessible to the computing device; and
submit, from the computing device, the automatically generated random credential to the on-line resource as a response to the registration credential request; and
after submitting the automatically generated random credential to the on-line resource:
receive a request to access the on-line resource through a user input interface of the computing device;
receive, from the on-line resource, at least one authentication credential request;
identify, for each of the at least one authentication credential request, the random credential associated with the authentication credential request; and
submit at least one associated random credential to the on-line resource to gain access to the on-line resource; and
a host server accessible on the network, the host server operative to:
receive registration information stored by the computing device in the data store, the registration information comprising the random credential stored in association with the on-line resource identifier and the registration credential request identifier;
store the registration information in a data store accessible to the host server; and,
transmit the registration information to a replacement computing device.

19. The system of claim 18 wherein the host server is further operative to:
store the registration information in encrypted form; and,
transmit a cryptographic key to the replacement computing device with the encrypted registration information, the cryptographic key operative with a cryptographic algorithm executed by the replacement computing device to decrypt the registration information.

20. One or more non-transitory computer-readable media storing instructions which, when executed, cause a computing device to:
connect to an on-line resource over a network to register a user of the computing device, the on-line resource identified by an on-line resource identifier;
receive, from the on-line resource, at least one registration credential request for a credential to use in registering the user with the on-line resource, each of the at least one registration credential request comprising a registration credential request identifier;
in response to receiving the at least one registration credential request, for each of the at least one registration credential request:
automatically generate a random credential that satisfies one or more criteria associated with the registration credential request;
storing the automatically generated random credential in association with the on-line resource identifier and the registration credential request identifier in a data store accessible to the computing device; and
submitting the automatically generated random credential to the on-line resource as a response to the registration credential request; and
after submitting the automatically generated random credential to the on-line resource:
receive a request to access the on-line resource through a user input interface of the computing device;
receive, from the on-line resource, at least one authentication credential request;
identify, for each of the at least one authentication credential request, the random credential associated with the authentication credential request; and
submit at least one associated random credential to the on-line resource to gain access to the on-line resource.

* * * * *

UNITED STATES PATENT AND TRADEMARK OFFICE
CERTIFICATE OF CORRECTION

| | |
|---|---|
| PATENT NO. | : 9,864,851 B2 |
| APPLICATION NO. | : 14/235384 |
| DATED | : January 9, 2018 |
| INVENTOR(S) | : Neil Patrick Adams et al. |

It is certified that error appears in the above-identified patent and that said Letters Patent is hereby corrected as shown below:

On the Title Page

Column 2 item (74) (Attorney, Agent or Firm), Line 1, Delete "Fish & Richarson P.C." and insert -- Fish & Richardson P.C. --, therefor.

In the Claims

In Column 14, Line 62-63, In Claim 3, after "identifier" delete "for the on line resource".

Signed and Sealed this
Fourteenth Day of June, 2022

Katherine Kelly Vidal
*Director of the United States Patent and Trademark Office*